United States Patent Office 2,705,236
Patented Mar. 29, 1955

2,705,236

HEXACHLORO-METHANO-OXA-EPOXY-NAPHTHALENE COMPOUNDS

Morton Kleiman, Chicago, Ill., assignor to Arvey Corporation, Chicago, Ill., a corporation of Illinois No Drawing. Application July 14, 1953,
Serial No. 367,968

5 Claims. (Cl. 260—346.2)

This invention relates to a new group of compositions of matter. More specifically, this invention relates to a group of compounds characterized in part by their having a partially hydrogenated naphthalene structure with the 1,4 and 5,8 carbon atoms thereof being bridged respectively by an endomethano group and an oxygen bridge. These compounds are further characterized in that they are hexahalogenated in fixed and known positions and are particularly characterized in that each contains at least three oxygen atoms per molecule, each contains an epoxide group, and each contains a side chain in the number 5 position, said side chain containing at least one oxygen atom.

The compounds of the present invention can be represented by the following structural formula:

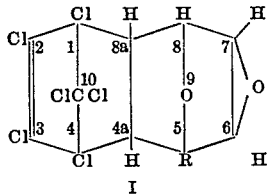

I wherein R is an oxygen containing organic radical of the group consisting of acetoxymethyl (—CH$_2$OCOCH$_3$), hydroxymethyl (—CH$_2$OH), methoxymethyl (—CH$_2$OCH$_3$)

and diacetoxymethyl (—CH[OCOCH$_3$]$_2$).

Thus, the present compounds would be named as follows:

1,2,3,4,10,10-hexachloro-1,4 - methano - 5 - acetoxymethyl-5, 8-oxa-6,7-epoxy-1,4,4a,5,6,7,8,8a - octahydronaphthalene.

1,2,3,4,10,10-hexachloro-1,4 - methano - 5 - hydroxymethyl-5,8-oxa-6,7-epoxy - 1,4,4a,5,6,7,8,8a - octahydronaphthalene.

1,2,3,4,10,10-hexachloro-1,4-methano - 5 - methoxymethyl-5,8-oxa-6,7-epoxy - 1,4,4a,5,6,7,8,8a - octahydronaphthalene.

1,2,3,4,10,10-hexachloro-1,4-methano-5,8 - oxa - 6,7-epoxy-1,4,4a,5,6,7,8,8a-octahydronaphthaldehyde - 5 - diacetate.

The compounds of the present invention are unexpectedly active pesticidally and are very valuable insecticides from the standpoints both of immediate and residual control of insect pests.

The residual effectivness of the present compounds, each of which contains at least three oxygen atoms, is greatly increased, thereby decreasing the number of applications required in the control of insects.

Further, each of the present compounds contains a reactive, oxygen-containing side chain enabling the formation of a wide variety of derivatives possessing insecticidal and fungicidal properties. The ability to modify the properties of known insecticides becomes increasingly important in view of the increasing ability of insects to build up resistance to presently used insecticides. It is, therefore, not only important that there be a wide variety of insecticides available, but it is equally important that insecticides be capable of chemical modification to forms against which insects have not acquired a tolerance.

The present compounds are further of value in that, bearing an epoxide linkage, they are capable of forming complexes with heavy metal salts which impart fungicidal properties in addition to the existing insecticidal properties possessed by the material.

Broadly, the products of the present invention are prepared by epoxidizing the Diels-Alder adduct of 1,2,3,4,7,7-hexachlorobicyclo-(2.2.1)-2,5-heptadiene and a compound of the group consisting of furfuryl acetate, furfuryl alcohol, furfuryl methyl ether and furfural diacetate.

The preparation of the aforementioned Diels-Alder adducts which are the starting materials for the present invention are described and claimed in my copending application, Serial No. 367,967, filed of even date herewith.

The products of the present invention are prepared by epoxidizing the intermediates defined in the aforementioned copending application by reaction thereof with an organic per-acid such as perbenzoic acid, peracetic acid, and mono-perphthalic acid. Epoxidation occurs at the nonchlorinated olefinic linkage, the carbon atoms thereof having the numbers 6 and 7, respectively.

It is preferred that any mineral acid, such as free sulfuric acid, which may be present in the organic per-acid be neutralized with an alkaline material such as sodium acetate. The reason for this is that free mineral acid may tend to cause the breaking of the epoxide ring structure, thereby decreasing the yield of desired product.

Normal room temperature or somewhat elevated temperatures, such as up to about 100° C., are very satisfactory for the production of the products of this invention. It is further preferred that a molar excess of organic per-acid be utilized.

Example I illustrates the preparation of 1,2,3,4,10,10-hexachloro-1,4-methano-5-acetoxymethyl-5,8 - oxa - 6,7-epoxy - 1,4,4a,5,6,7,8,8a - octahydronaphthalene from 1,2,3,4,10,10-hexachloro-1,4-methano-5 - acetoxymethyl-5,8-oxa-1,4,4a,5,6,7,8,8a-hexahydronaphthalene.

*Example 1*

Into a 250 cc., 3-necked flask equipped with a reflux condenser, stirrer, thermometer and separatory funnel is placed 1,2,3,4,10,10-hexachloro-1,4-methano - 5 - acetoxymethyl-5,8-oxa-1,4,4a,5,8,8a - hexahydronaphthalene (16.7 grams dissolved in 40 cc. glacial acetic acid). The contents of the flask are warmed up to 75° C. and 11.2 cc. of peracetic acid (45.8%) is added in a dropwise manner through the separatory funnel. After this addition is complete glacial acetic acid (27 cc.) is added to the reaction mixture and the aforementioned temperature is maintained for an additional 4.5 hours. The extent of reaction is determined periodically by titrating a known aliquot of the reaction mixture iodometrically. When the reaction is substantially complete, the entire contents of the flask are poured into ice water. A crystalline material precipitates and is removed by filtration. The product is purified by dissolving in diethyl ether and washing the ether solution with dilute sodium carbonate solution. The ether solution may be dried over anhydrous Na$_2$SO$_4$ and the ether removed by evaporation. The product is recrystallized from an acetone-hexane mixture.

Similarly, specific methods for preparing the 5-hydroxymethyl epoxide, the 5-methoxymethyl epoxide, and the epoxide of the naphthaldehyde-5-diacetate are use of the corresponding Diels-Alder adducts disclosed in the aforementioned copending application as starting material in the foregoing example.

I claim:

1. As a new composition of matter, a compound having the structure:

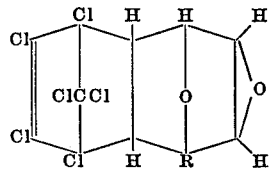

wherein R is an oxygen containing organic radical selected from the group consisting of (1) —CH$_2$OH, (2) —CH$_2$OCH$_3$, (3) —CH$_2$OCOCH$_3$, and (4)

—CH(OCOCH$_3$)$_2$ 2. 1,2,3,4,10,10-hexachloro-1,4-methano - 5 - acetoxymethyl-5,8-oxa-6,7-epoxy - 1,4,4a,5,6,7,8,8a - octahydronaphthalene.

3. 1,2,3,4,10,10-hexachloro-1,4-methano - 5 - hydroxymethyl-5,8-oxa-6,7-epoxy - 1,4,4a,5,6,7,8,8a - octahydronaphthalene.

4. 1,2,3,4,10,10-hexachloro-1,4-methano-5 - methoxymethyl-5,8-oxa-6,7-epoxy - 1,4,4a,5,6,7,8,8a - octahydronaphthalene.

5. 1,2,3,4,10,10-hexachloro-1,4-methano - 5,8-oxa-6,7-epoxy-1,4,4a,5,6,7,8,8a-octahydronaphthaldehyde - 5 - diacetate.

References Cited in the file of this patent

UNITED STATES PATENTS

| | | |
|---|---|---|
| 2,655,513 | Kleiman | Oct. 13, 1953 |
| 2,655,514 | Kleiman | Oct. 13, 1953 |